UNITED STATES PATENT OFFICE.

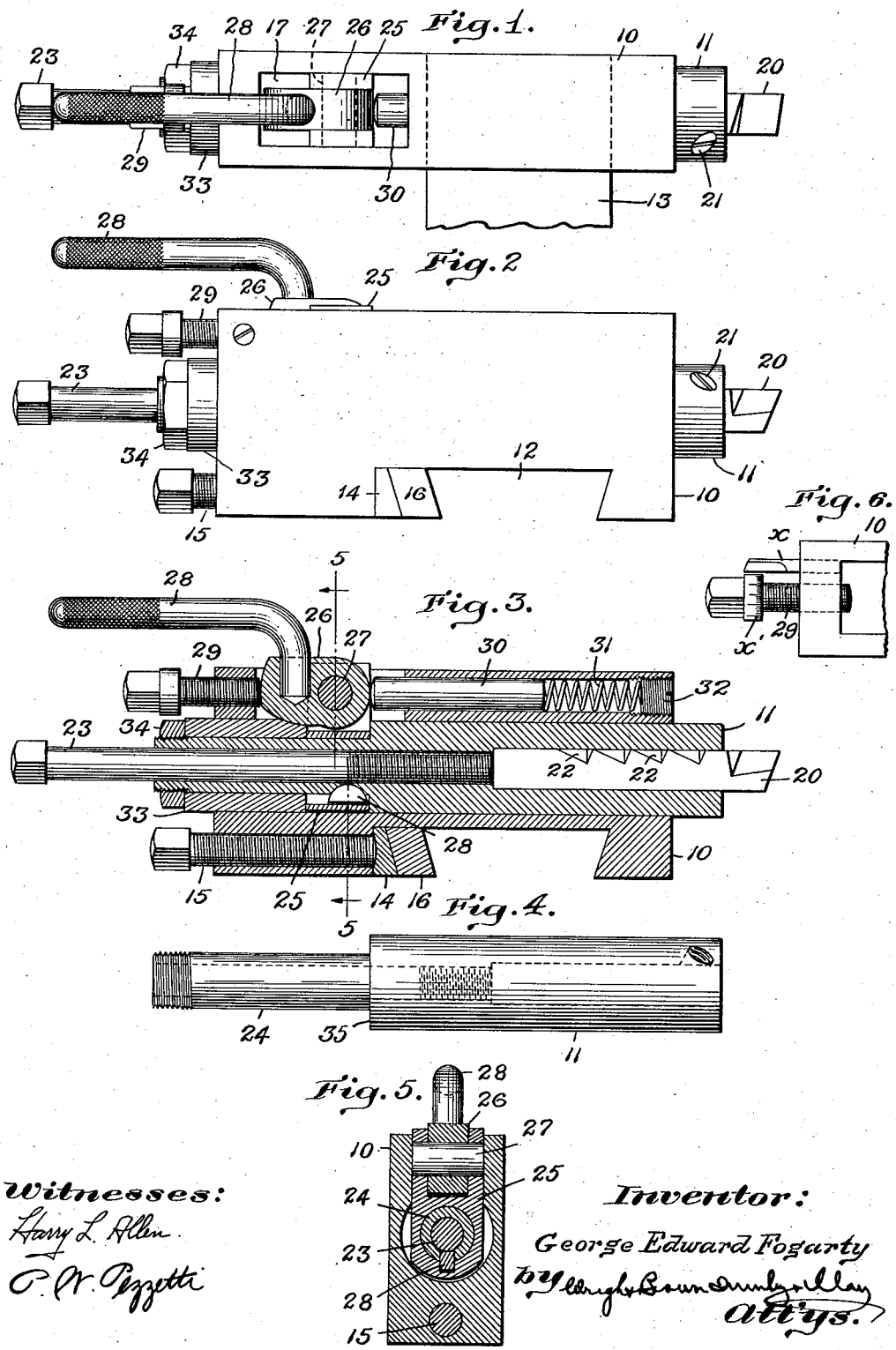

GEORGE EDWARD FOGARTY, OF FITCHBURG, MASSACHUSETTS, ASSIGNOR TO FITCH-
BURG MACHINE WORKS, OF FITCHBURG, MASSACHUSETTS, A CORPORATION OF
MASSACHUSETTS.

TOOL-CARRIER.

1,027,535.          Specification of Letters Patent.          Patented May 28, 1912.

Application filed May 24, 1911. Serial No. 629,137.

*To all whom it may concern:*

Be it known that I, GEORGE EDWARD FO-GARTY, of Fitchburg, in the county of Worcester and State of Massachusetts, have invented certain new and useful Improvements in Tool-Carriers, of which the following is a specification.

The present invention relates to tool carriers for lathes.

In turning a number of pieces of work of the same dimensions, it is, of course, necessary to keep the tool at the same distance from the axis of the work when operating upon the several pieces. It is desirable to retract the tool from the work transversely of the path in which the tool is fed, so as to avoid scratching the turned surface of the work when the tool carrier is moved back in the opposite direction from that in which it is fed.

The present invention provides a tool carrier in which the tool is movably mounted and in which is mechanism adapted to effect retraction of the tool in the carrier and to restore the tool quickly and accurately to its desired working position with relation to the carrier.

Of the accompanying drawings which illustrate one form in which the invention may be embodied: Figure 1 represents a top plan view of the tool carrier in working condition. Fig. 2 represents a side elevation thereof. Fig. 3 represents a longitudinal vertical section of the tool carrier. Fig. 4 represents an elevation of a movable holder for the tool. Fig. 5 represents a vertical cross section on line 5—5 of Fig. 3. Fig. 6 represents a top plan view of a portion of the tool block and micrometer adjustment.

The same reference characters indicate the same parts wherever they occur.

The tool carrier comprises a block 10 and a tool holder 11 mounted in the block so as to be adapted to slide therein. The block is adapted to be mounted upon a feed carriage (not shown), and is formed with a groove 12 adapted to receive a dovetail guide 13 on the feed carriage. One face of the groove 12 is undercut to fit one side of the guide 13. A gib 14 having one undercut face is adapted to fit the other side of the guide 13. The block is provided with a set screw 15 which is adapted to force the gib 14 against one side of the guide to draw the tool block against the opposite side of the guide. The width of the guide 13 is considerably less than the space between the gib 14 and the opposite face of the groove. A gib 16 is adapted to be interposed between the gib 14 and one side of the guide 13 or between the other side of the guide and the confronting face of the block 10. When the setscrew 15 is tightened, the block is rigidly secured to the guide so that the block is substantially fixed to the feed carriage.

The tool is indicated at 20. It is mounted in a recess in the holder 11 and is affixed to the holder by a setscrew 21 threaded in the holder. The tool is notched at a series of points to provide faces 22 against which the inner end of the screw 21 coacts. As the tool becomes worn and its cutting end ground, it may be advanced to cause the desired face 22 to register with the setscrew. A screw 23 is threaded in the holder so as to abut against the inner end of the tool to brace the tool against the work. The holder 11 is adapted to slide longitudinally of the tool in its bearing in the block 10. The holder is preferably cylindric, because this form permits the greatest accuracy in fitting it in the block. One end of the holder is reduced in diameter to form a stem 24. Upon the stem is placed a block 25 in which is mounted a cam member 26. The block 25 is slotted on one side to provide a space for the reception of the cam member. The cam member is mounted upon a pivot stud 27 carried by the block 25. The block and holder are connected by a key 28 which prevents turning of the holder in the block. The block 10 is formed with an opening 17, the walls of which engage the block 27 to prevent turning of the latter. The cam member is provided with a handle 28 by which it may be turned about its pivot stud. The cam coöperates with an abutment on the block 10 and thereby effects sliding movement of the tool holder. The abutment illustrated is an adjusting screw, indicated at 29. The block 10 is bored to provide a chamber in which are placed a follower 30 and a spring 31 adapted to press the follower against the cam member 26 so as to keep the cam member against the abutment 29. The spring 31 is confined in the chamber by a screw plug 32.

In assembling the tool carrier, the neck 24 of the holder is slipped through the block 25 when the block is in the opening 17. A sleeve 33 is then slipped upon the end of the neck 24 and is forced tightly against the block 25 by a nut 34 threaded upon the end of the neck. In this way the block 25 is clamped against the shoulder 35 of the tool holder and is fixed with relation to the holder. The desired adjustment of the tool is found by turning the screw 29 in one direction or the other while the cam member is in the position illustrated. At the completion of the feeding movement of the tool it may be retracted transversely of its feeding movement by lifting the handle 28 to turn the cam member about its pivot stud. The spring follower then acts to retract the tool holder relatively to the block 10. When the carrier has been placed in position ready for the next feeding movement, the tool may be quickly restored to its former working position by swinging the cam member back to the position shown. The cam member, acting against the abutment 29, advances the tool holder against the tension of the spring 31.

The means by which the tool is secured in the holder 11 is designed to hold the tool so securely as to prevent vibration of the tool when under stress. It will be observed that the faces 22 are inclined. When the inner end of the screw 21 is in coactive engagement with one of the faces 22, the tool is positively confined in the holder so that it cannot be forced out by the screw 23. The thrust of the screw 23 not only keeps the face 22 in coactive engagement with the screw 21, but it effects lateral thrust of the tool, due to the inclination of the face 22, so that the tool is held seated against the bottom of its recess in the holder. The wedging action to which the tool is subjected by the screw 23 and face 22 eliminates every possibility of vibration of the tool with relation to the holder 11. As previously stated, the holder 11 is preferably cylindric, because that form permits greater accuracy in fitting it in the block 10. By the combination of these elements, designed in accordance with the foregoing explanation, the tool, although retractable with relation to the carrier, is held therein as securely as if it were in fact fixed directly to the block 10.

According to the arrangement illustrated, the tool is set for work of relatively large diameter. In order to advance the tool toward the axis of the work more than the movement within the range of the screw 29, the setscrew 21 may be loosened and the tool advanced with relation to the holder 11 until another face 22 is moved into register with the screw 21. Another way to advance the tool toward the work would be to shift the gib 16 to the opposite side of the groove 12. The shifting of the gib 16 advances the entire carrier instead of advancing the tool with relation to its holder, and it is preferable because the tool should not be withdrawn to any great extent from the holder, especially for heavy work.

It is desirable to provide an index for the adjusting screw 29. Such index is shown by Fig. 6, and comprises the index pin $x$ projecting from the tool block into close relation with a collar on the adjusting screw. The collar is provided with index marks, as indicated at $x'$, with which the index pin coöperates.

I claim:

1. A tool carrier comprising a block, a tool holder carried by said block and adapted to move toward and from the work with relation to said block, yielding means for retracting the tool holder from the work, and two coöperative members, one for adjusting said holder to the desired working position and the other being manually movable for effecting movement of the holder to and from working position without disturbing said adjusting member, one of said members being mounted on the block and the other being carried by the tool holder.

2. A tool carrier comprising a block, a tool holder carried by said block and adapted to move toward and from the work with relation to the block, yielding means for retracting the tool holder from the work, and two coöperative members for positioning the tool holder, one of said members being mounted on the block, and the other carried by the tool holder, one of said members being an adjustable abutment and the other being manually movable for advancing the tool holder to working position, said movable member having a face for holding the tool holder in working position, and a cam portion for effecting the advance movement and for permitting receding movement of the tool holder.

3. The combination of a tool and holder therefor, said holder having a recess for insertion of the tool, a screw in threaded engagement with the holder and arranged to engage the side of the tool, said tool having a notch a face of which is adapted to coact with said screw to positively lock said tool against withdrawal from the holder, and a second screw in threaded engagement with said holder and arranged to abut against the inner end of the tool to hold the tool in coactive engagement with the screw first mentioned.

4. The combination of a tool and holder therefor, said holder having a recess for insertion of the tool, a screw in threaded engagement with said holder and arranged to engage a side of the tool, said tool having a series of notches adapted to receive the end of said screw, each of said notches leaving an inclined face on the tool adapted to coact with the end of said screw to prevent withdrawal of the tool from the holder and to keep the tool against one side of the recess, and a second screw in threaded engagement with the holder and arranged to abut against the inner end of the tool to keep the tool in coactive engagement with the screw first mentioned.

In testimony whereof I have affixed my signature, in presence of two witnesses.

GEO. EDWARD FOGARTY.

Witnesses:
 JOHN SMITH,
 FRANK COOPER.